United States Patent
Turner (10) Patent No.: US 9,769,579 B2
(45) Date of Patent: *Sep. 19, 2017

(54) APPARATUS AND METHOD FOR DETECTING INSERTION ANOMALY OF AN AUDIO JACK

(71) Applicant: Fairchild Semiconductor Corporation, San Jose, CA (US)

(72) Inventor: John R. Turner, Portland, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/597,910

(22) Filed: Jan. 15, 2015

(65) Prior Publication Data

US 2015/0208154 A1    Jul. 23, 2015

Related U.S. Application Data (60) Provisional application No. 61/929,387, filed on Jan. 20, 2014.

(51) Int. Cl.
*H04R 29/00* (2006.01)
*H04R 1/10* (2006.01)

(52) U.S. Cl.
CPC .......... *H04R 29/00* (2013.01); *H04R 1/1016* (2013.01)

(58) Field of Classification Search
CPC .................................. H04R 1/06; H04R 29/00
(Continued)

(56) References Cited

U.S. PATENT DOCUMENTS 5,960,367 A     9/1999  Kita
7,142,123 B1 *  11/2006 Kates .................. G01N 27/048
                                                  340/602
(Continued)

FOREIGN PATENT DOCUMENTS

CN       104796820 A      7/2015
CN       104796839 A      7/2015
(Continued)

OTHER PUBLICATIONS

"U.S. Appl. No. 14/597,953, Non Final Office Action mailed Jul. 15, 2016", 16 pgs.

(Continued)

*Primary Examiner* — Gerald Gauthier
(74) *Attorney, Agent, or Firm* — Brake Hughes Bellermann LLP (57) ABSTRACT

Apparatus and methods for detecting audio jack connection anomalies such as moisture or a partial insertion of an audio jack plug with an audio jack receptacle are provided. In an example, a method for detecting an audio jack insertion anomaly can include ramping on a first detection current source of a detection circuit coupled to a detection terminal of a first audio jack connector, receiving a reference information at a comparator of the detection circuit, receiving a voltage of the detection terminal at the comparator, providing comparison information at an output of the comparator, the comparison information indicative of a comparison of the voltage of the detection terminal and the reverence information, and wherein a first state of the comparison information indicates the audio jack insertion anomaly is due to moisture at the first audio jack connector.

20 Claims, 7 Drawing Sheets

(58) Field of Classification Search
USPC ........... 174/520; 307/116; 327/385; 340/505, 340/602; 345/156; 361/752, 760; 381/58, 74, 123, 150; 439/620.01, 439/620.21, 141
See application file for complete search history.

(56) References Cited

U.S. PATENT DOCUMENTS

| | | | | |
|---|---|---|---|---|
| 8,492,661 | B2* | 7/2013 | Jol | H01R 13/521 174/50 |
| 8,636,527 | B2* | 1/2014 | Hengel | B60L 11/1818 439/141 |
| 9,031,253 | B2* | 5/2015 | Shah | H04R 5/04 381/74 |
| 9,210,555 | B2* | 12/2015 | Larson | H04M 1/6058 |
| 9,294,857 | B2 | 3/2016 | Prentice | |
| 9,398,126 | B2* | 7/2016 | Larson | H04M 1/05 |
| 2001/0034214 | A1 | 10/2001 | Koike | |
| 2003/0013499 | A1 | 1/2003 | Aotake et al. | |
| 2003/0115240 | A1 | 6/2003 | Cho | |
| 2005/0020205 | A1 | 1/2005 | Khoini-poorfard | |
| 2005/0020217 | A1 | 1/2005 | Khoini-poorfard | |
| 2006/0058069 | A1 | 3/2006 | Garcia et al. | |
| 2007/0133828 | A1* | 6/2007 | Kanji | G06F 3/16 381/123 |
| 2007/0223718 | A1 | 9/2007 | Felder et al. | |
| 2008/0107288 | A1 | 5/2008 | Chen | |
| 2009/0179768 | A1 | 7/2009 | Sander et al. | |
| 2010/0127848 | A1* | 5/2010 | Mustapha | G08B 21/20 340/505 |
| 2010/0151740 | A1 | 6/2010 | Hogue et al. | |
| 2010/0260371 | A1 | 10/2010 | Afshar | |
| 2011/0237131 | A1 | 9/2011 | Fields et al. | |
| 2011/0300751 | A1* | 12/2011 | Wittenberg | G01D 21/02 439/620.21 |
| 2012/0019306 | A1* | 1/2012 | Turner | H03K 5/1254 327/385 |
| 2012/0050151 | A1* | 3/2012 | Dabov | H05K 5/061 345/156 |
| 2012/0051007 | A1* | 3/2012 | Alvarez | H05K 5/0213 361/752 |
| 2012/0051015 | A1* | 3/2012 | Dabov | G06F 1/1656 361/760 |
| 2013/0020882 | A1* | 1/2013 | Prentice | H04R 29/004 307/116 |
| 2013/0021046 | A1 | 1/2013 | Prentice et al. | |
| 2013/0034242 | A1 | 2/2013 | Prentice et al. | |
| 2013/0156216 | A1 | 6/2013 | Shah et al. | |
| 2013/0202134 | A1 | 8/2013 | Afshar | |
| 2014/0038460 | A1* | 2/2014 | Lee | H04R 29/004 439/620.01 |
| 2014/0056461 | A1 | 2/2014 | Afshar | |
| 2014/0281093 | A1 | 9/2014 | Beckman | |
| 2015/0043757 | A1* | 2/2015 | Prentice | H04M 1/72527 381/150 |
| 2015/0208154 | A1* | 7/2015 | Turner | H04R 29/00 381/58 |
| 2015/0208155 | A1* | 7/2015 | Turner | H04R 1/06 381/58 |

FOREIGN PATENT DOCUMENTS

| | | |
|---|---|---|
| KR | 1020150008688 A | 7/2015 |
| KR | 1020150087123 A | 7/2015 |

OTHER PUBLICATIONS

"U.S. Appl. No. 14/597,953, Notice of Allowance mailed Nov. 3, 2016", 9 pgs.
"U.S. Appl. No. 14/597,953, Response filed Oct. 17, 2016 to Non Final Office Action mailed Jul. 15, 2016", 9 pgs.

\* cited by examiner

APPARATUS AND METHOD FOR
DETECTING INSERTION ANOMALY OF AN
AUDIO JACK

CLAIM OF PRIORITY AND RELATED APPLICATIONS

This application claims the benefit of priority under 35 U.S.C. 119(e) to Turner, U.S. Provisional Patent Application No. 61/929,387, filed on Jan. 20, 2014, and titled, "APPARATUS AND METHOD FOR DETECTING PARTIAL INSERTION OF AN AUDIO JACK," which is hereby incorporated by reference herein in its entirety.

BACKGROUND

Many mobile devices, such as mobile phones or other portable electronics, include audio jacks and are configured to distinguish between a variety of external audio jack accessories using either the baseband processor of the mobile device or a detection circuit. Automatic detection of the connection or the disconnection of an accessory device can improve a user's experience as the detection process can reduce the effort required by a user to enjoy the benefits of a connected accessory. However, since the mobile device and the accessory are exposed, and rely on certain user actions to connect or disconnect each to each other, failure to establish a proper connection such as by a partial insertion of the audio jack plug or moisture on the audio jack connectors can cause detection failures and can result in a degraded user experience.

OVERVIEW

Apparatus and methods for detecting audio jack connection anomalies such as moisture or a partial insertion of an audio jack plug with an audio jack receptacle are provided. In an example, a method for detecting an audio jack insertion anomaly can include ramping on a first detection current source of a detection circuit coupled to a detection terminal of a first audio jack connector, receiving a reference information at a comparator of the detection circuit, receiving a voltage of the detection terminal at the comparator, providing comparison information at an output of the comparator, the comparison information indicative of a comparison of the voltage of the detection terminal and the reverence information, and wherein a first state of the comparison information indicates the audio jack insertion anomaly is due to moisture at the first audio jack connector.

This overview is intended to provide a partial summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In an example, a system can include a device, such as a cellular phone, a portable music player, or one or more other portable or other devices configured to receive an audio jack. The device can include a processor (e.g., a baseband processor, etc.) and an audio jack receptacle (e.g., a three-pole audio jack receptacle, a four-pole audio jack receptacle, or one or more other audio jack receptacles) configured to receive an audio jack (e.g., a three-pole audio jack, a four-pole audio jack, or one or more other audio jacks corresponding to the audio jack receptacle) coupled to an external device, such as a microphone, a speaker, a headset, or one or more other external devices. The audio jack receptacle can be configured to receive an input (e.g., a microphone input, send/end key detection, one or more other external input, etc.) from the external device, or to provide an output (e.g., a speaker output, an external device control, etc.) to the external device.

In certain examples, the mobile device can be programmed or can include a circuit to detect connection of an accessory device using the audio jack and can detect disconnection of the accessory. Such detection functions can automatically configure the processor for use with the accessory device when connected and for use when the accessory device is removed. However, when the accessory device is partially connected, for example, when the audio jack plug is partially inserted into the audio jack receptacle, or when the connection of the accessory is contaminated such as by moisture, the detection functions as well as functional components of the mobile device can crash or become unreliable. In some detection methods, moisture at the audio jack connector or partial insertion or retraction of the audio jack plug can result in audible tone being broadcast on a pin that is often associated with a speaker, such as an earbud speaker.

The present inventor has recognized apparatus and methods for complimenting the detection functions that can allow for graceful detection and recovery from less than optimum connection of an accessory device without generating unanticipated sounds on an accessory earbud speaker or other kind of speaker.

Figure 1:
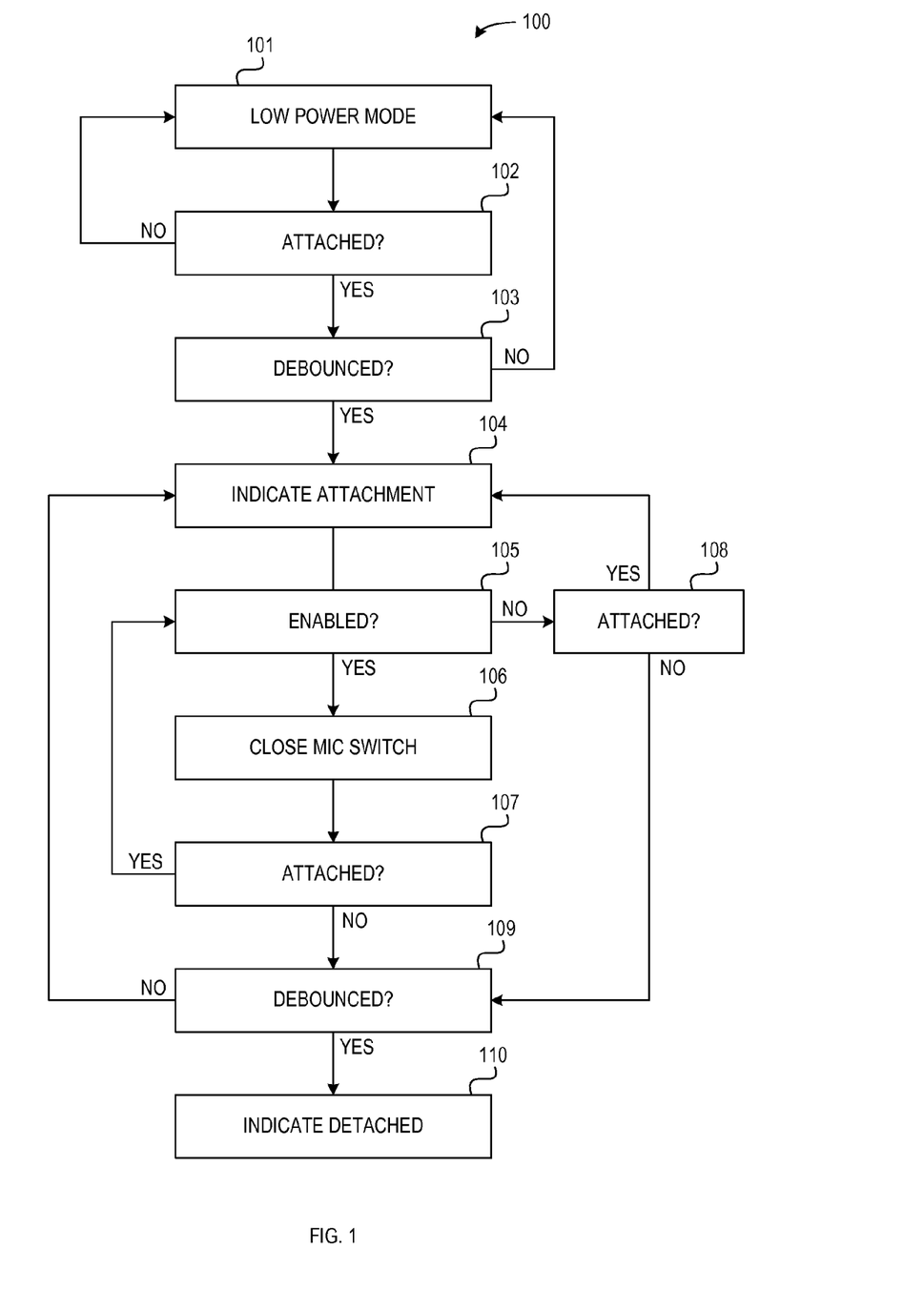
FIG. 1 illustrates an example method for monitoring connection of an audio jack to or from a mobile device.

FIG. 1 illustrates an example method 100 for monitoring connection of an audio jack to or from a mobile device. At 101, the method 100 can start with the audio jack not connected to the mobile device and the mobile device in a low-power operating mode that includes disabling circuits that can be used to operate an accessory device. At 102, one or more of the contacts associated with the audio jack can be monitored to detect whether an audio jack plug has been or is being inserted into an audio jack receptacle. In certain examples, the audio jack receptacle is associated with the mobile device and the audio jack plug is associated with the accessory device. In certain examples, the audio jack receptacle is associated with the accessory device and the audio jack plug is associated with the mobile device. At 103, if insertion is detected, the connection of the audio jack plug and the audio jack receptacle can be debounced. If the connection is not maintained over the debounce interval, the method 100 can maintain the low-power operating mode and can continue to monitor for an addition indication of an insertion of an audio jack plug. At 104, if an audio jack connection is maintained over the debounce interval, an attachment indication can be enabled to indicate to the processor of the mobile device that an accessory is attached. At 105, the method 100 can monitor an enable input, such as an enable input from the mobile device processor and if the input is in the proper enable command state, at 106, certain actions can be executed to take advantage of the functionality of the accessory including, for example, enabling a microphone switch. In certain examples, the mobile device processor can exit the low-power mode when the accessory device is enabled. After enabling the accessory device, the method 100 can monitor for disconnection of the audio jack at 107. Referring to the method flow at 108, if the enable input remains in a disable command state, the method 100 can continue to monitor that the accessory is attached to the mobile device by, for example, opening and closing a microphone switch and monitoring one or more of the other audio jack inputs for a similar pattern that indicates the audio jack is not completely inserted or is in the process of being retracted from the receptacle. At 109, the connection is again debounced by monitoring the state of one of the audio jack contacts. At 110, if the state of the contact remains stable and indicates the audio jack is not connected, the method 100 can return to the low-power mode of operation. At 109, if the state of the contact indicates that the audio jack is connected, the method 100 can return to 104 and 105 to provide a connection indication and to monitor the enable input. The present inventor has recognized that in certain situations, an improper insertion or the presence of moisture can result in the audio detection method getting caught in a loop that can place an audible tone on a speaker of an accessory device.

Figure 2A:
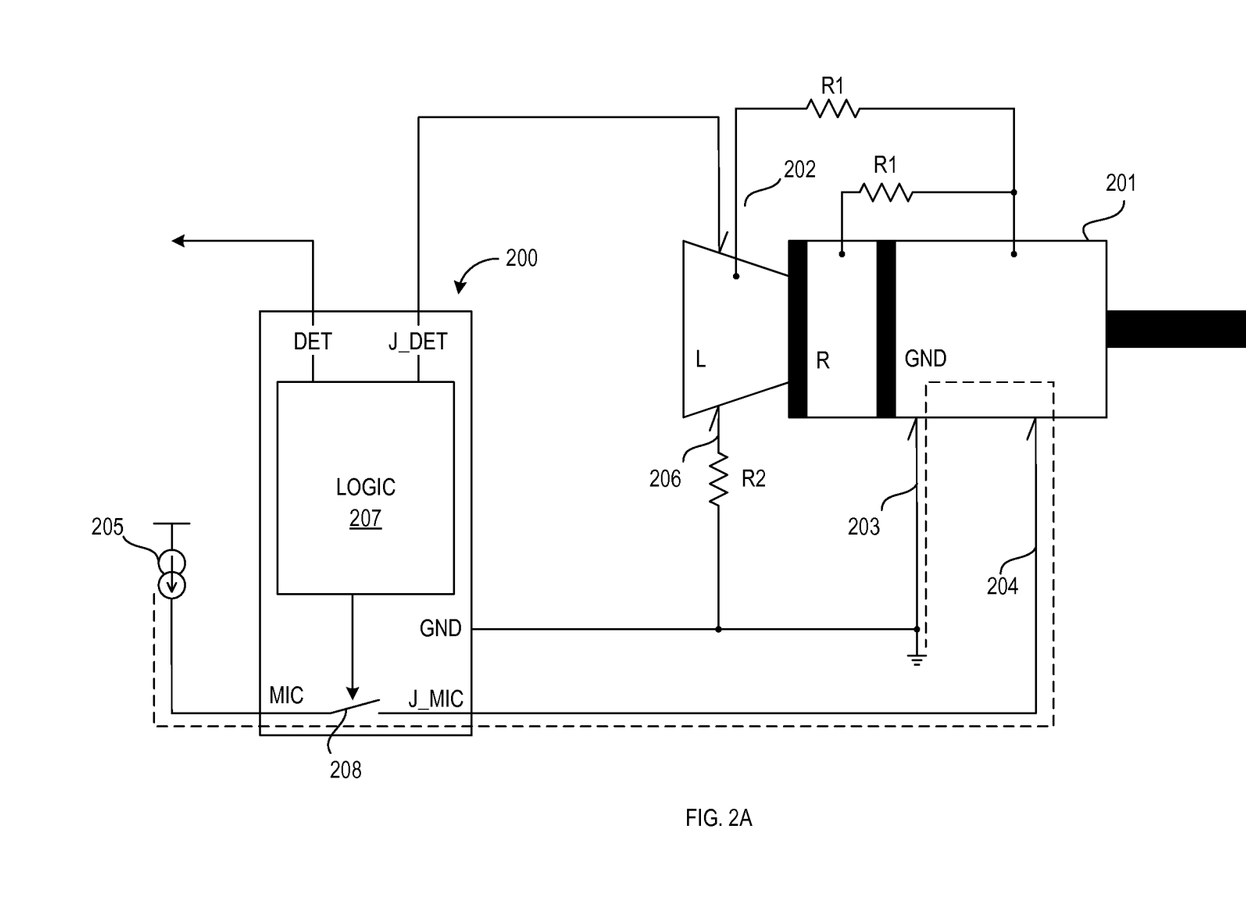
FIG. 2A illustrates generally a example detection circuit coupled to a fully inserted audio jack plug.

FIG. 2A illustrates generally an example detect circuit or detection circuit 200 coupled to an audio jack receptacle and a fully inserted audio jack plug 201. The audio jack plug 201 can include a first contact 202 sometimes associated with a left speaker contact (L) of an accessory, a second contact 203 and a third contact 204 associated with a ground or common contact of an accessory. In certain examples, the detection circuit 200 can include a detection input (J_DET) a ground terminal (GND) and a microphone terminal (J_MIC). In some examples, the detection circuit 200 can include an output (DET) for providing indication that an accessory device is coupled to the mobile device. In some examples, the detection circuit 200 can include an enable input (not shown) for receiving enable and disable commands. In some examples, the detection circuit 200 can include detection logic 207 for receiving commands from the mobile device processor, for detecting certain events associated with an audio jack connector, for providing indication when an audio jack plug and an audio jack receptacle are properly connected, and for controlling one or more switches 208 to provide these functions. In some examples, such as when the mobile device can be connected to a microphone through an audio jack, the detection circuit 200 can receive a microphone bias (MIC). In certain examples, the mobile device can include a bias source 205, such as a current source, for biasing certain circuits of an accessory device such as a microphone. In some examples, the bias source 205 can be used to determine if an audio jack remains connected such as when a connection has been detected and debounced but the mobile device processor has not enabled the accessory. In such examples, the bias source 205 can be connected to the microphone terminal at a certain frequency and a different terminal such as detection input (J_DET) can be monitored. When the audio jack is correctly and fully inserted, the periodic connection of the bias source can be grounded using a path (dotted line) including the second contact 203 and the third contact 204 such that no disturbance is observed on the detection input (J_DET).

Figure 2B:
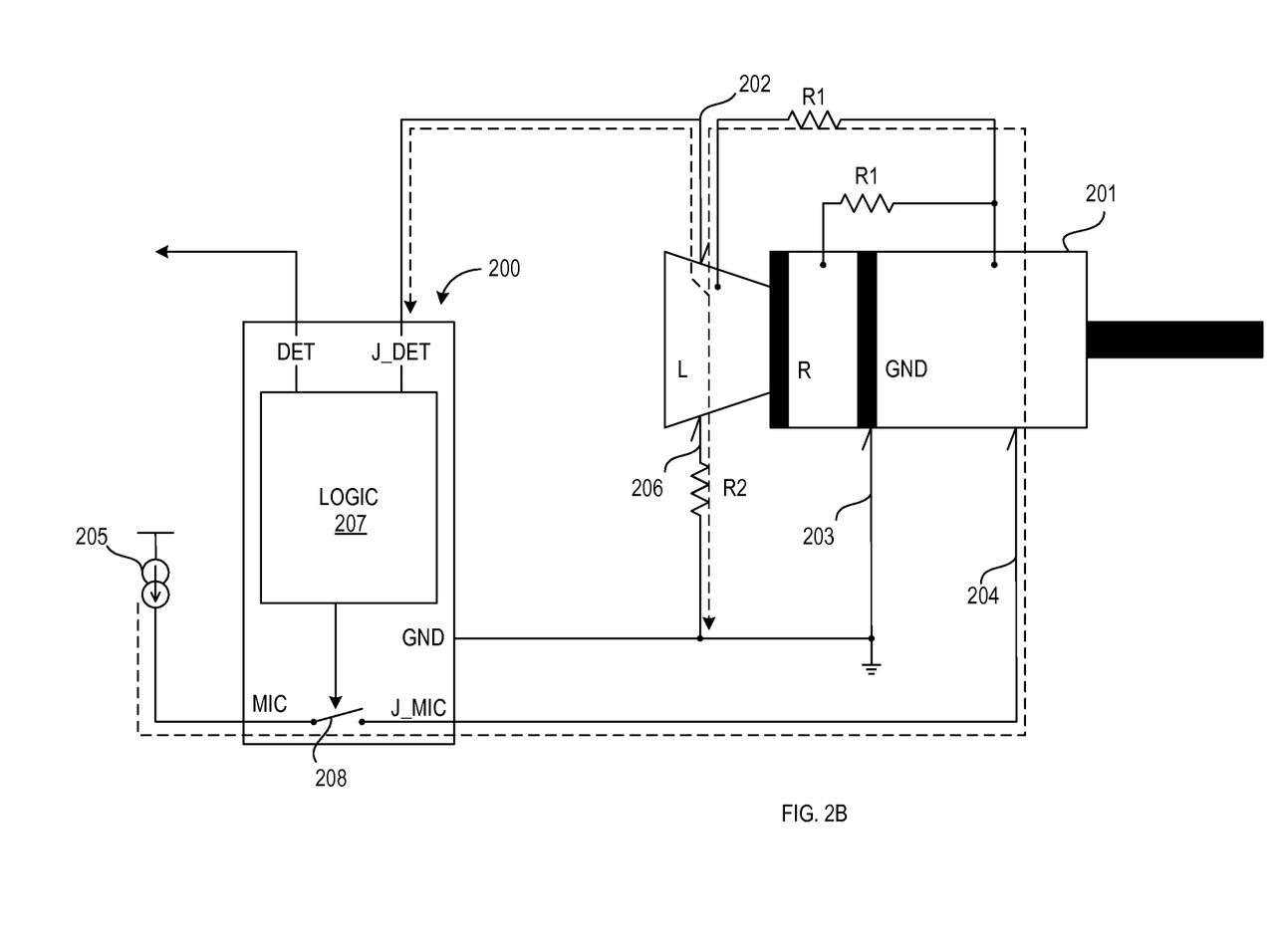
FIG. 2B illustrates generally an example detection circuit coupled to a partially inserted or partially disconnected audio jack plug.

FIG. 2B illustrates generally an example detect circuit or detection circuit 200 coupled to a partially inserted or partially disconnected audio jack plug 201. In such a situation, periodic connection of the bias source 205 can result in disturbance being detected on the detection input (J_DET) through a path (dotted line) including the first contact 202, the third contact 204, and a resistive contact 206 coupled to ground. In certain situations, similar disturbances can be detected on fully and properly inserted audio jack connectors when moisture is present. In certain methods of detecting connection or disconnection of an audio jack connector, periodic connection of the bias source 205 to the microphone input (J_MIC) can result in annoying tones being broadcast on a speaker of an accessory device.

Figure 3:
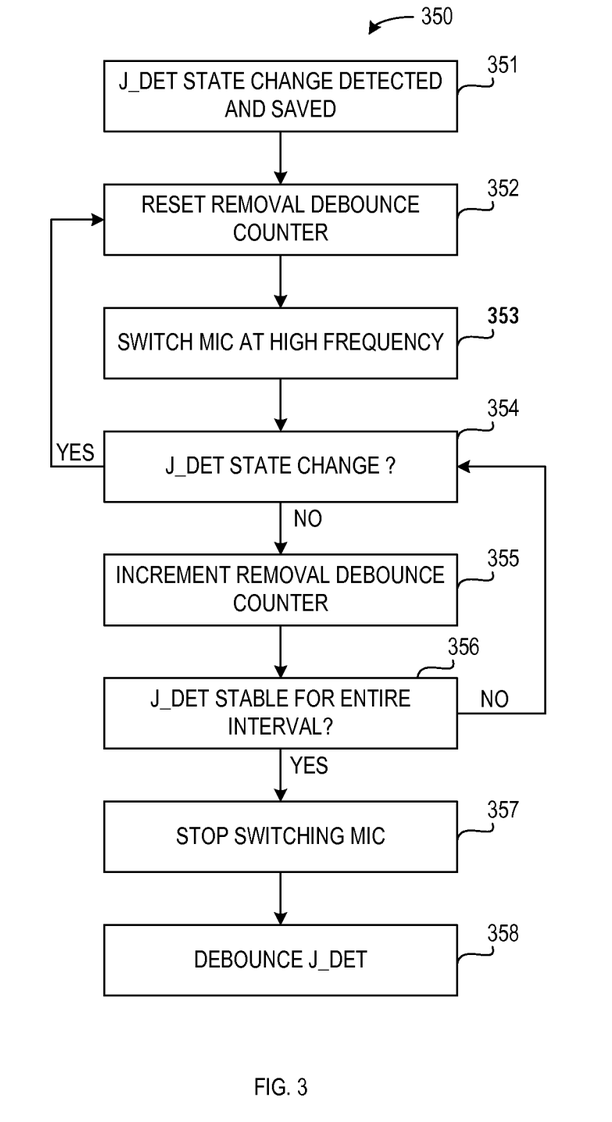
FIG. 3 illustrates generally a flowchart for an example method of recovering from a connection anomaly.

FIG. 3 illustrates generally a flowchart for an example method 350 of recovering from a connection anomaly. Such an anomaly can include, but is not limited to, a partially inserted or removed audio jack plug, moisture present in the audio jack connection and electrical interference. The method 300 begins after an audio jack connection has been detected, debounced and an indication of a properly inserted audio jack plug has been provided to the mobile device processor. At 351, the detection input changes state indicating the audio jack plug may be removed or in the process of being removed and the last state of the detection input is saved. At 352, a removal debounce counter is reset. At 353 the microphone switch can be toggled at a frequency above the audible range for human hearing such as above 20 kHz and the state of the detection input and the debounce interval can continued to be monitored. In certain examples, the microphone switch can couple an oscillating signal source to the microphone terminal to apply an oscillating signal to the microphone terminal. In certain examples, the oscillating signal can have a frequency at or above 20 kHz. In certain examples, the oscillating signal can have a frequency at or above 33 kHz. In certain examples, the oscillating signal source can include a bias source for an accessory microphone. At 354, the detect input can be compared to the saved state, the comparison can be evaluated for a change of the state of the detect input (J_DET), and the new state saved if a change is detected. If the state of the detect input (J_DET) has changed, the method loops and the removal debounce counter is reset at 352. In certain examples, the state of the detect input has changed if the current state equals the saved state. In some examples, the state of the detect input has changed if the current state does not equal the saved state. If the detect input state has not changed, the removal debounce counter is incremented at 355. At 356, the removal debounce counter is compared to a threshold or predetermined value to indicate that the detect input (J_DEC) has stabilized for a certain predetermined recovery check interval. If the second debounce timer has not reached the predetermined value, the method loops and the state of the detection input and the debounce interval can continue to be monitored. It is understood that is possible to implement the removal debounce counter as a countdown counter to indicate the conclusion of a time interval without departing from the scope of the present subject matter. In certain examples, the removal counter can be reset to a predetermined value or count and can be decremented to a second predetermined value, such as zero, to provide an adequate stabilization period for evaluating the state of the detect input (J_DET).

Referring to FIG. 2B, if the audio jack plug 201 is partially inserted, the detection input (J_DET) can receive a periodic signal indicative of the switching of the microphone switch. However, since the signal is at a frequency that is inaudible, the signal will not cause an audible tone, for example, if the audio jack plug 201 is being removed or detached from the mating receptacle and the third contact 204 is sliding over connection points for earbud speakers or other accessory speaker connection points. In certain examples, the switching frequency of the microphone switch (MIC) can be greater than 20 kilohertz. In some examples, the switching frequency of the microphone switch (MIC) can be about 33 kilohertz and the predetermined value can result in a debounce time of about 80 μsec.

Referring again to FIG. 3, at 356, if the removal debounce counter reaches the predetermined value, the audio jack plug may have been removed or fully inserted, the method 300, at 357, can then stop the switching of the microphone switch (MIC) and, at 358, can debounce the detect input (J_DET) to determine whether the audio jack has been fully inserted or fully removed. In certain examples, the non-switching debounce time can be less than 10 milliseconds. In some examples, the non-switching debounce time can be less than 5 milliseconds. In some examples, the non-switching debounce time can be about 1 millisecond.

In some examples, a detection circuit can include a high current source to assist in distinguishing between a partial insertion condition, a moisture condition and full insertion when an anomaly appears on the detection input after attachment has been detected and debounced. Some situations that can cause anomalies on the detection input (J_DET) can include, but are not limited to, the process of withdrawing an audio jack plug from an audio jack receptacle, moisture fouling one or more contacts of the audio jack connector, a partially inserted audio jack plug, some type of electrical interference, or combinations thereof.

Figure 4:
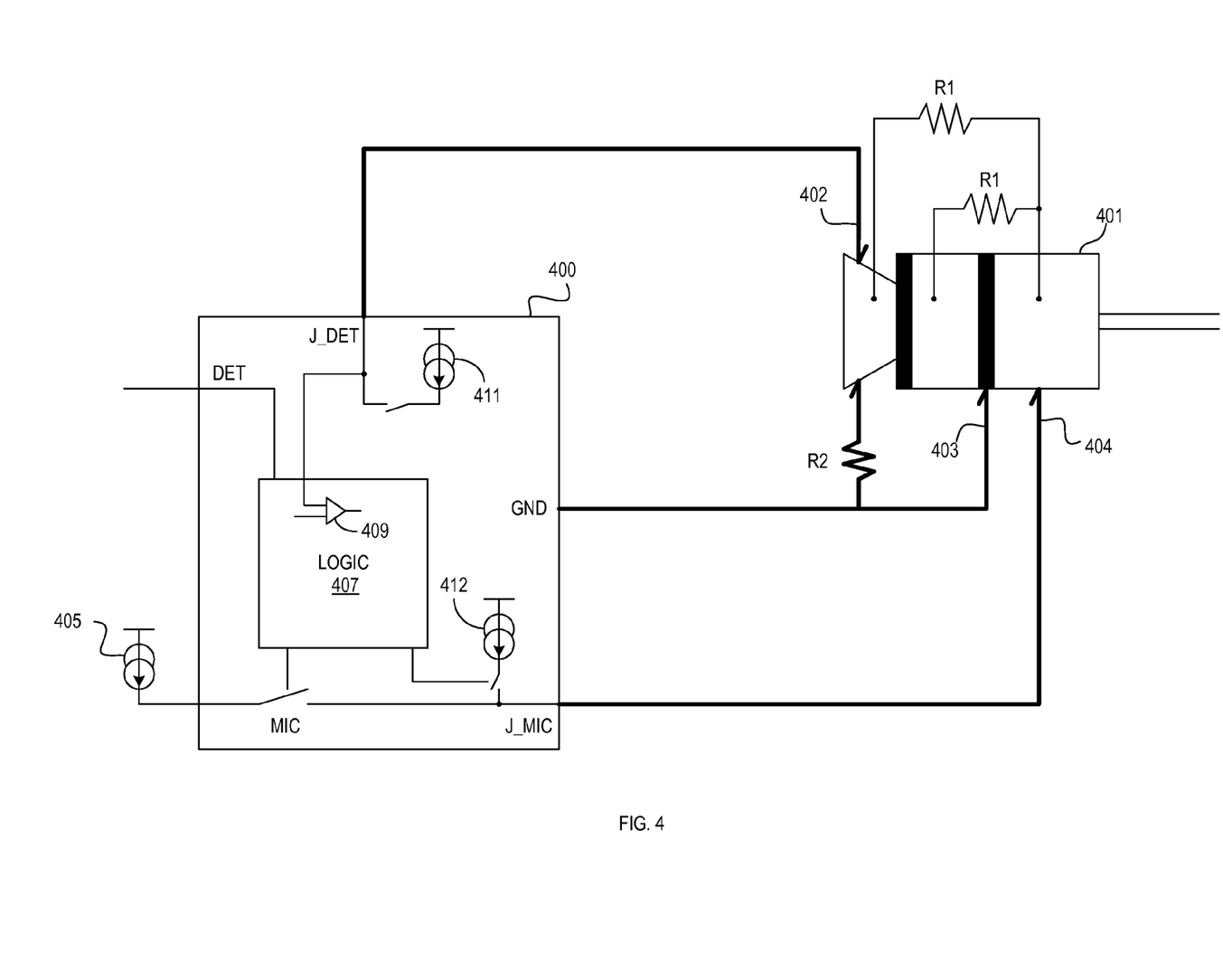
FIG. 4 illustrates generally an example accessory detection circuit for a mobile device.

FIG. 4 illustrates generally an example accessory detect circuit or detection circuit 400 for a mobile device. The detection circuit 400 can be coupled to a first input 402 (J_DET), a second contact 403 (GND), and a third input 404 (J_MIC) for connection to contacts of one half of an audio jack connector and for coupling to contacts or terminals for the other half of the audio jack connector when the two halves are connected. The example of FIG. 4 illustrates example contact positions when an audio jack plug 401 is partially inserted into an audio jack receptacle. In certain examples, the detection circuit 400 can include logic (LOGIC) 407 for receiving commands from the mobile device processor, for detecting certain events associated with an audio jack connector, for providing indication when an audio jack plug and an audio jack receptacle are properly connected, and for controlling one or more switches to provide these functions. In some examples, the detection circuit 400 can include a comparator 409 for identifying certain connection anomalies, such as, but not limited to, the moisture and partial connection anomalies discussed herein. In some examples, the comparator 409 can provide comparison results to help identify valid audio jack connections, as well as, full removal of an audio jack plug from an audio jack receptacle. In certain examples, the mobile device can include a bias source 405, such as a current source, for biasing certain circuits of an accessory device such as a microphone. In certain examples, the detection circuit 400 can include one or more detection current sources 411, 412. In some examples, one or more of the detection current sources 411, 412 can source 2 times to 200 times more current than the bias source. In certain examples, the detection current sources 411, 412 can be used to distinguish whether a detection anomaly is due to moisture or a partial insertion of an audio jack plug within an audio jack receptacle. In some examples, a first detection current source 411 can be switched into and out of connection with the detection input (J_DET) of the detection circuit. In some examples, a second detection current source 412 can be switch into and out of connection with the microphone input (J_MIC) of the detection circuit.

Figure 5:
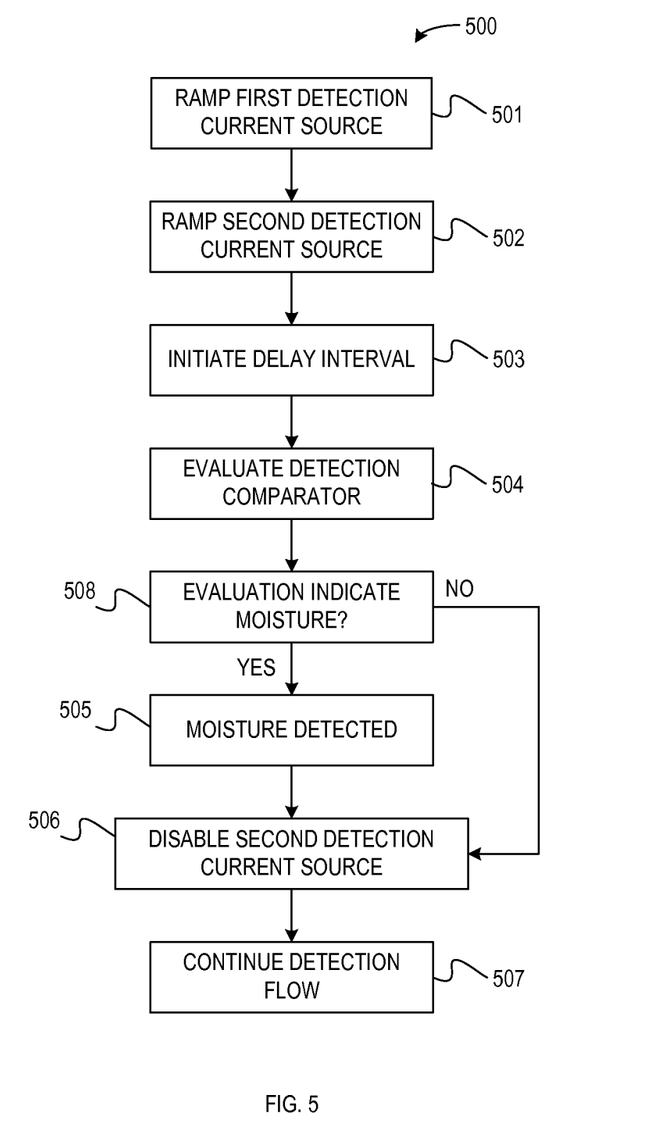
FIG. 5 illustrates generally an example moisture or partial insertion detection method using detection current sources.

FIG. 5 illustrates generally an example moisture or partial insertion detection method using detection current sources. At 501, a first detection current source can be coupled to the detection input (J_DET) and can be initiated to ramp to a first detection level. At 502, a second detection current source can be coupled to the microphone input (J_MIC) and can be initiated to ramp to a second detection level. In certain examples, the initiation of the first and second detection current sources can be executed simultaneously or one immediately after the other before checking the ramping progress. At 503, when both detection current sources are at their respective first and second detection levels, the method can start a delay for an interval, such as about 5 milliseconds (ms). At 504, an output of a comparator, or comparison results, can be evaluated several times during the delay. In certain examples, the comparator can have a first input coupled to the detection input (J_DET) and a second input coupled to a reference voltage. In certain examples, the reference voltage can be configured such that if the audio jack is coupled properly and with no moisture, the output of the comparator will consistently remain low. In some examples, at 504, the comparator can be evaluated three times during the delay, for example, at 2.5 ms, at 3.75 ms and at 5 ms, although it is understood that other times and other lengths of delay are possible without departing from the scope of the present subject matter. If the output of the comparator does not remain low for each evaluation 508 of the detection input (J_DET) during the delay, at 505, the detection circuit can set a bit indicating that moisture is present or the audio jack plug is not completely inserted in the audio jack receptacle. At 506, the second detection current source coupled to the microphone input (J_MIC) can be decoupled and disabled. In certain examples, the first detection current source can be decoupled and disabled. In some examples, at 507, the first detection current source can be used to further detect a particular resistance associated with the accessory that can be used to identify the particular accessory coupled to the mobile device using the audio jack connector.

Figure 6:
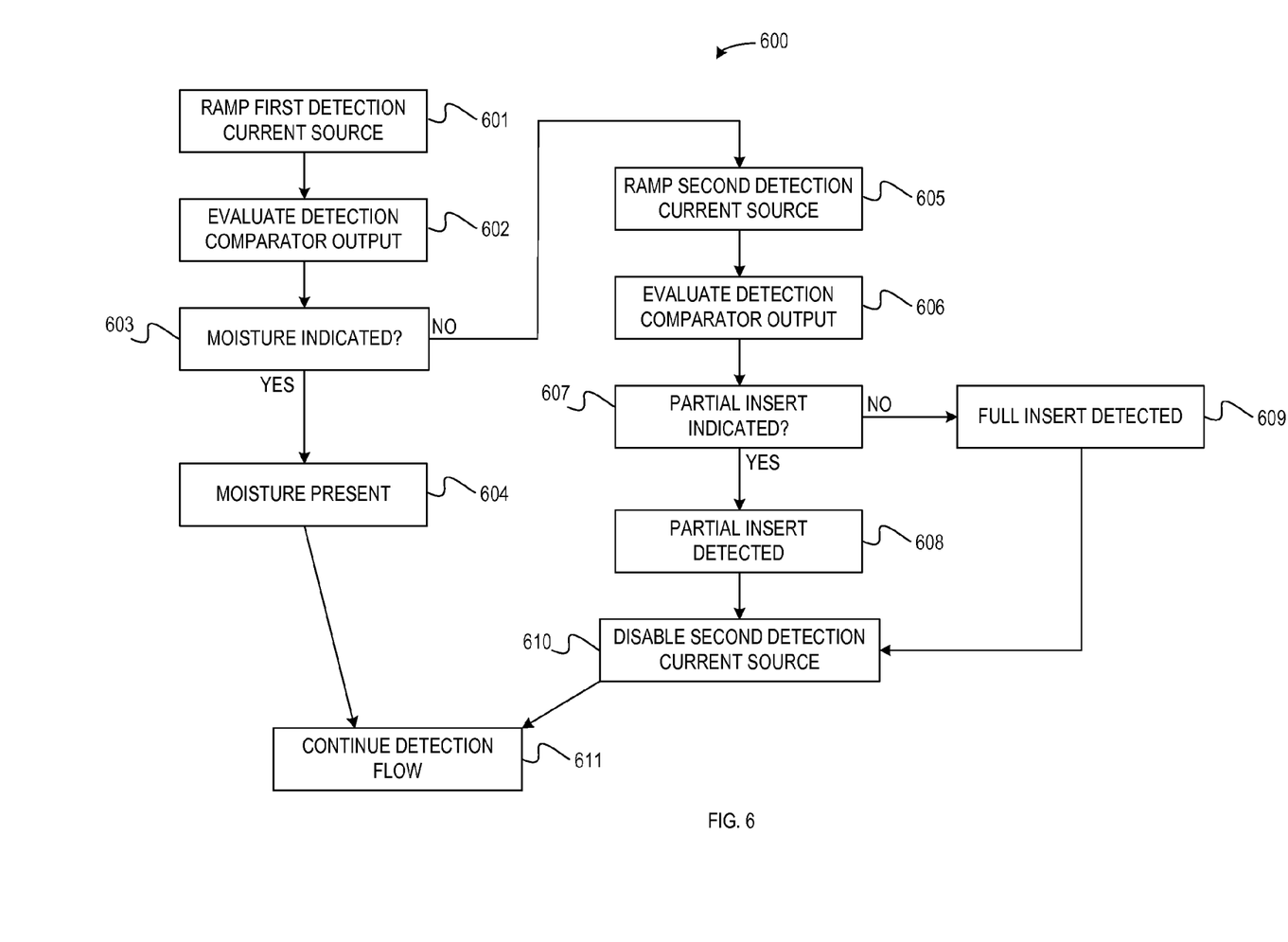
FIG. 6 illustrates generally an alternative example moisture or partial insertion detection method using detection current sources.

FIG. 6 illustrates generally an alternative example moisture or partial insertion detection method 600 using detection current sources. At 601, a first detection current source can be coupled to the detection input (J_DET) and can be initiated to ramp to a first detection level. In certain examples, a second detection current source can be disabled and decoupled from the microphone input (J_MIC). At 602, an output of a detection comparator can be evaluated over a certain interval. In some examples, the output can be evaluated three times over the interval, such as at 2.5 ms, at 3.75 ms and at 5 ms, although it is understood that other times and other lengths of the interval are possible without departing from the scope of the present subject matter. At 603, if the output state of the comparator does not remain constant or indicates a high resistance between the detection input and ground, the detection circuit can assume there is moisture present, at 604, the audio jack connector. In some examples, the detection circuit can provide an indication to the mobile device that moisture is present at the audio jack connector. In some examples, the indication can include setting an output of the detection circuit coupled to the mobile device processor to a particular state.

At 603, if the output state of the comparator remains constant and indicates a resistance between the detection input and ground that is lower than a moisture threshold, at 605, a second detection current source can be coupled to the microphone input and ramped to a second detection level. At 606, the output of the detection comparator can be evaluated over a certain interval. In some examples, the output of the detection comparator can be evaluated three times over the interval, such as at 2.5 ms, at 3.75 ms and at 5 ms, although, it is understood that other times and other lengths of the interval are possible without departing from the scope of the present subject matter. At 607, if the output state of the comparator does not remain constant or indicates a high resistance between the detection input and ground, the detection circuit can assume the audio jack connector is only partially connected or the audio jack plug is only partially inserted into the audio jack receptacle 608. In certain examples, at 607, if the output state of the comparator remains constant and indicates a resistance between the detection input and ground that is lower than a partial connection threshold, the detection circuit can assume the audio jack connector is properly connected at 609, and at 610, can disable the second detection current source. In certain examples, at 611, the method can continue to other audio jack detection method flows whether moisture was detected, a partial insertion was detected, or a full insertion was detected. In some examples, the detection circuit can provide an indication to the mobile device that a partial insertion was detected at the audio jack connector. In some examples, the indication can include setting an output of the detection circuit coupled to the mobile device processor to a particular state.

EXAMPLES AND NOTES

In Example 1, a method for detecting an audio jack insertion anomaly can include ramping on a first detection current source of a detection circuit coupled to a detection terminal of a first audio jack connector, receiving a reference information at a comparator of the detection circuit, receiving a voltage of the detection terminal at the comparator, providing comparison information at an output of the comparator, the comparison information indicative of a comparison of the voltage of the detection terminal and the reverence information, and wherein a first state of the comparison information indicates the audio jack insertion anomaly is due to moisture at the first audio jack connector.

In Example 2, the providing comparison information of Example 1 optionally includes evaluating a plurality of comparison results over a predetermined comparison interval.

In Example 3, the evaluating a plurality of comparison results over a predetermined comparison interval of any one or more of Examples 1-2 optionally includes evaluating more than two comparison results over the predetermined comparison interval.

In Example 4, the method of any one or more of Examples 1-3 optionally includes ramping on a second detection current source of the detection circuit.

In Example 5, the method of any one or more of Examples 1-4 optionally includes providing second comparison information at an output of the comparator, the second comparison information indicative of a second comparison of the voltage of the detection terminal and second reference information.

In Example 6, the providing second comparison information of any one or more of Examples 1-5 optionally includes evaluating a plurality of second comparison results over a second predetermined comparison interval.

In Example 7, the evaluating a plurality of second comparison results over a second predetermined comparison interval of any one or more of Examples 1-6 optionally includes evaluating more than two second comparison results over the second predetermined comparison interval.

In Example 8, if the plurality of second comparison results are consistently at a first level, the method of any one or more of Examples 1-7 optionally includes providing an output indicative of a full insertion of the first audio jack connector with a second audio jack connector.

In Example 9, the method of any one or more of Examples 1-8 optionally includes disabling the second detection current source.

In Example 10, if the plurality of second comparison results are not consistently at a first level, the method of any one or more of Examples 1-9 optionally includes providing an output indicative of a partial insertion of the first audio jack connector with a second audio jack connector.

In Example 11, the method of any one or more of Examples 1-2 optionally includes disabling the second detection current source.

In Example 12, the ramping on the second detection current source of any one or more of Examples 1-2 optionally includes ramping the second detection current source simultaneously with ramping the first detection current source.

In Example 13, the providing comparison information of any one or more of Examples 1-12 optionally includes evaluating a plurality of comparison results over a predetermined comparison interval.

In Example 14, if the plurality of comparison results are consistently at a first level, the method of any one or more of Examples 1-13 optionally includes providing an output indicative of no moisture at the first audio jack connector.

In Example 15, the method of any one or more of Examples 1-14 optionally includes disabling the second detection current source.

In Example 16, if the plurality of comparison results are not consistently at a first level, the method of any one or more of Examples 1-15 optionally includes providing an output indicative of moisture at the first audio jack connector.

In Example 17, the method of any one or more of Examples 1-16 optionally includes disabling the second detection current source.

In Example 18, a detect circuit can include a comparator and a plurality of switches configured to perform the method of any one or more of Examples 1-17.

Example 19 can include, or can optionally be combined with any portion or combination of any portions of any one or more of Examples 1 through 20 to include, subject matter that can include means for performing any one or more of the functions of Examples 1 through 18, or a machine-readable medium including instructions that, when performed by a machine, cause the machine to perform any one or more of the functions of Examples 1 through 18.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for monitoring and recovering from audio jack connection anomalies of a mobile device, the method comprising:
   detecting a state change of a detection terminal of an audio jack detection circuit of the mobile device from a first state to a second state;
   applying an oscillating signal to a microphone terminal of the audio jack detection circuit in response to the detected state change using an oscillating signal source of the mobile device;
   detecting at logic of detection circuit, a stable state of the detection terminal for a debounce period using the second state and the oscillating signal;
   stop applying the oscillating signal to the microphone terminal after detecting the stable state of the detection terminal; and
   providing an indication of a connected state of an audio jack connector or a disconnected state of the audio jack connector after detecting the stable state of the detection terminal.

2. The method of claim 1, wherein if the connected state of the audio jack connector is provided, the method includes:
   ramping on a first detection current source of the audio jack detection circuit coupled to the detection terminal of a first audio jack connector;
   receiving a reference information at a comparator of the audio jack detection circuit;
   receiving a voltage of the detection terminal at the comparator;
   providing comparison information at an output of the comparator, the comparison information indicative of a comparison of the voltage of the detection terminal and the reference information; and
   wherein a first state of the comparison information indicates an audio jack insertion anomaly is due to moisture at the first audio jack connector.

3. The method of claim 2, wherein the providing comparison information includes evaluating a plurality of comparison results over a predetermined comparison interval.

4. The method of claim 3, wherein the evaluating a plurality of comparison results over a predetermined comparison interval includes evaluating more than two comparison results over the predetermined comparison interval.

5. The method of claim 2, including ramping on a second detection current source of the audio jack detection circuit.

6. The method of claim 3, including providing second comparison information at an output of the comparator, the second comparison information indicative of a second comparison of the voltage of the detection terminal and second reference information.

7. The method of claim 6, wherein the providing second comparison information includes evaluating a plurality of second comparison results over a second predetermined comparison interval.

8. The method of claim 7, wherein the evaluating a plurality of second comparison results over a second predetermined comparison interval includes evaluating more than two second comparison results over the second predetermined comparison interval.

9. The method of claim 7, wherein if the plurality of second comparison results are consistently at a first level, the method includes providing an output indicative of a full insertion of the first audio jack connector with a second audio jack connector.

10. The method of claim 9, including disabling a second detection current source of the audio jack detection circuit.

11. The method of claim 7, wherein if the plurality of second comparison results are not consistently at a first level, the method includes providing an output indicative of a partial insertion of the first audio jack connector with a second audio jack connector.

12. The method of claim 11, including disabling a second detection current source of the audio jack detection circuit.

13. The method of claim 5, wherein the ramping on the second detection current source includes ramping the second detection current source simultaneously with ramping the first detection current source.

14. The method of claim 13, wherein the providing comparison information includes evaluating a plurality of comparison results over a predetermined comparison interval.

15. The method of claim 14, wherein if the plurality of comparison results are consistently at a first level, the method includes providing an output indicative of no moisture at the first audio jack connector.

16. The method of claim 15, including disabling the second detection current source.

17. The method of claim 14, wherein if the plurality of comparison results are not consistently at a first level, the method includes providing an output indicative of moisture at the first audio jack connector.

18. The method of claim 11, including disabling a second detection current source of the audio jack detection circuit.

19. The method of claim 1, including resetting a removal debounce counter before applying the oscillating signal; and wherein the detecting a stable state of the detection terminal includes comparing a current state of the detection terminal to a saved state of the detection terminal;

incrementing the removal debounce counter if the second state equals the saved state;

comparing a value of the removal debounce counter to a threshold; and indicating the stable state of the detection terminal if the value of the removal debounce counter exceeds the threshold.

20. The method of claim 19, including resetting the value of the removal debounce counter if the current state does not equal the saved state; and saving the current state as the saved state.

* * * * *